United States Patent
Williams et al.

(10) Patent No.: US 12,287,944 B2
(45) Date of Patent: *Apr. 29, 2025

(54) CONTINUOUS TOUCH INPUT OVER MULTIPLE INDEPENDENT SURFACES

(71) Applicant: Apple Inc., Cupertino, CA (US)

(72) Inventors: Reuben J. Williams, Mountain View, CA (US); Clark E. Waterfall, Mountain View, CA (US); Eng Eow Goh, San Jose, CA (US); Karan S. Jain, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/619,707

(22) Filed: Mar. 28, 2024

(65) Prior Publication Data

US 2024/0241611 A1    Jul. 18, 2024

Related U.S. Application Data

(63) Continuation of application No. 18/175,961, filed on Feb. 28, 2023, now Pat. No. 11,972,083, which is a continuation of application No. 17/444,262, filed on Aug. 2, 2021, now Pat. No. 11,625,131.

(60) Provisional application No. 63/160,639, filed on Mar. 12, 2021.

(51) Int. Cl.
*G06F 3/044* (2006.01)
*G06F 3/04883* (2022.01)

(52) U.S. Cl.
CPC ........ *G06F 3/0446* (2019.05); *G06F 3/04883* (2013.01)

(58) Field of Classification Search
CPC ............................ G06F 3/0446; G06F 3/04883
See application file for complete search history.

(56) References Cited

U.S. PATENT DOCUMENTS

| | | | |
|---|---|---|---|
| 7,046,230 | B2 | 5/2006 | Zadesky et al. |
| 7,333,092 | B2 | 2/2008 | Zadesky et al. |
| 7,593,782 | B2 | 9/2009 | Jobs et al. |
| 7,910,843 | B2 | 3/2011 | Rothkopf et al. |
| 8,044,314 | B2 | 10/2011 | Weber et al. |
| 8,330,061 | B2 | 12/2012 | Rothkopf et al. |

(Continued)

FOREIGN PATENT DOCUMENTS

| | | |
|---|---|---|
| CN | 1926604 A | 3/2007 |
| CN | 201315050 Y | 9/2009 |

*Primary Examiner* — Michael Pervan
(74) *Attorney, Agent, or Firm* — Dorsey & Whitney LLP

(57) ABSTRACT

Touch input devices are provided with the capability of sensing a capacitive load in a two-dimensional array while also being able to sense deflection or movement of the input device in multiple different locations under an input pad. A touch input device can beneficially be used in a remote control device and can be used with multiple input buttons or platforms overlaying multiple capacitive touch input regions on a capacitive touch sensor substrate. Movement and position of a capacitive load can be tracked and calculated via output signals from a set of electrodes or other capacitance sensors with irregular shapes, with inconsistent distances from the capacitive load, and which are positioned below variable materials and material compositions. Thus, tracking gestures and taps can be detected using the capacitance sensing devices, and deflection input can be detected using switches or other actuators situated under the capacitance sensing devices.

20 Claims, 8 Drawing Sheets

(56) References Cited

U.S. PATENT DOCUMENTS

| | | |
|---|---|---|
| 8,416,198 B2 | 4/2013 | Rathnam et al. |
| 8,446,370 B2 | 5/2013 | Zadesky et al. |
| 8,552,990 B2 | 10/2013 | Marriott et al. |
| 8,820,133 B2 | 9/2014 | Weber et al. |
| 8,872,771 B2 | 10/2014 | Hotelling et al. |
| 9,013,398 B2 | 4/2015 | Chen et al. |
| 2007/0052044 A1 | 3/2007 | Forsblad et al. |
| 2007/0152983 A1 | 7/2007 | McKillop et al. |
| 2007/0242057 A1 | 10/2007 | Zadesky et al. |
| 2007/0276525 A1 | 11/2007 | Zadesky et al. |
| 2007/0291016 A1 | 12/2007 | Philipp |
| 2008/0012837 A1 | 1/2008 | Marriott et al. |
| 2008/0018615 A1 | 1/2008 | Zadesky et al. |
| 2008/0087476 A1 | 4/2008 | Prest et al. |
| 2009/0058687 A1 | 3/2009 | Rothkopf et al. |
| 2009/0058801 A1 | 3/2009 | Bull |
| 2009/0058802 A1 | 3/2009 | Orsley |
| 2009/0141046 A1 | 6/2009 | Rathnam et al. |
| 2009/0229892 A1 | 9/2009 | Fisher et al. |
| 2010/0058251 A1 | 3/2010 | Rottler et al. |
| 2011/0169667 A1 | 7/2011 | Rothkopf et al. |
| 2012/0019449 A1 | 1/2012 | Yilmaz et al. |
| 2012/0092330 A1 | 4/2012 | Chen et al. |
| 2013/0118879 A1 | 5/2013 | Rothkopf et al. |
| 2017/0010749 A1 | 1/2017 | Zadesky et al. |
| 2022/0291778 A1 | 9/2022 | Williams et al. |
| 2023/0205383 A1 | 6/2023 | Williams et al. |

CONTINUOUS TOUCH INPUT OVER MULTIPLE INDEPENDENT SURFACES

CROSS-REFERENCE TO RELATED APPLICATION(S)

This is a continuation of U.S. patent application Ser. No. 18/175,961, filed 28 Feb. 2023, and titled "CONTINUOUS TOUCH INPUT OVER MULTIPLE INDEPENDENT SURFACES," which is a continuation of U.S. patent application Ser. No. 17/444,262, filed 2 Aug. 2021, and titled "CONTINUOUS TOUCH INPUT OVER MULTIPLE INDEPENDENT SURFACES," which claims priority to U.S. Provisional Patent Application No. 63/160,639, filed 12 Mar. 2021, and titled "CONTINUOUS TOUCH INPUT OVER MULTIPLE INDEPENDENT SURFACES," the entire disclosures of which are hereby incorporated by reference.

FIELD

The described embodiments relate generally to hybrid touch and switch-based input devices. More particularly, the present embodiments relate to controllers configured to receive capacitive touch input and switch-actuating input through one or more adjacent surfaces.

BACKGROUND

Many styles of input devices exist for performing operations in a consumer electronic device. The operations often correspond to moving a cursor, making selections on a display screen or providing other input. By way of example, the input devices may include buttons, switches, keyboards, mice, trackballs, touch pads, joy sticks, touch screens and the like. Each of these devices has advantages and disadvantages that are taken into account when designing the consumer electronic device. In handheld devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, home, number, etc.).

In portable computing devices such as laptop computers, the input devices may include track pads (also known as touch pads). With a track pad, the movement of an input pointer (i.e., cursor) corresponds to the relative movements of the user's finger (or stylus) as the finger is moved along a surface of the track pad. Track pads can also make a selection on the display screen when one or more taps are detected on the surface of the track pad. In some cases, any portion of the track pad may be tapped, and in other cases a dedicated portion of the track pad may be tapped. In stationary devices such as desktop computers, the input devices are generally selected from mice and trackballs. With a mouse, the movement of the input pointer corresponds to the relative movements of the mouse as the user moves the mouse along a surface. With a trackball, the movement of the input pointer corresponds to the relative movements of a ball as the user rotates the ball within a housing. Both mice and trackballs generally include one or more buttons for making selections on the display screen.

Some devices, such as television remote controllers, video game controllers, and virtual reality (VR)/augmented reality (AR) controllers are intended to be used for inputs in a very small, typically handheld, form factor and without a user having to look at the controller to determine how to provide input. However, it can be difficult for users to navigate the different operations of a remote controller by touch, and large numbers of remote controller buttons can be overwhelming. Additionally, users are often unable to provide the kinds of fine inputs that are enabled by track pads. Accordingly, there is a constant need for improvements in the field of input devices.

SUMMARY

One aspect of the present disclosure relates to a remote control device, comprising a body housing, a capacitive touch input device including a first capacitive touch input region having a first edge and a second capacitive touch input region having a second edge, with the second edge being vertically aligned with the first edge, a controller device connected to the capacitive touch input device, and an electronic transmitter configured to transmit a signal based on input from the first and second capacitive touch input regions.

In some embodiments, the remote control device further comprises a first button overlaying the first capacitive touch input region and a second button overlaying the second capacitive touch input region, wherein the first button is vertically movable independent of the second button. The capacitive touch input device may have a first side surface and a second side surface, with the first capacitive touch input region being positioned on the first side surface, and with the second capacitive touch input region being positioned on the second side surface. The first capacitive touch input region and the second capacitive touch input region can collectively form a grid of sensors across the capacitive touch input device. A switch can be positioned beneath the capacitive touch input device, wherein the switch is actuatable upon application of a force against the capacitive touch input device. The capacitive touch input device can comprise a substrate bearing the first and second capacitive touch input regions, wherein the first edge and the second edge are positioned within a perimeter of the substrate, and wherein a portion of the perimeter overlaps the first capacitive touch input region or the second capacitive touch input region. In some embodiments, the first capacitive touch input region surrounds the second capacitive touch input region.

Another aspect of the disclosure relates to an electronic controller, comprising an enclosure, a capacitive touch input device having a first region and a second region, a first switch positioned in the enclosure and aligned with the first region of the capacitive touch input device, a second switch positioned in the enclosure and aligned with the second region of the capacitive touch input device, and a controller in electronic communication with the capacitive touch input device, the first switch, and the second switch. The controller can be configured to output a first signal indicating two-dimensional coordinates of a touch sensed by the capacitive touch input device, output a second signal in response to actuation of the first switch, and output a third signal in response to actuation of the second switch.

In some embodiments, the first switch can be actuatable by application of a force against a surface at the first region and the second switch is actuatable by application of a force against a surface at the second region. The first switch can provide tactile feedback when actuated. The two-dimensional coordinates can indicate a two-dimensional position of the touch on a touch surface adjacent to the capacitive touch input device. The controller can be configured to output a signal indicating a two-dimensional gesture based on movement of a capacitive load substantially parallel to the capacitive touch input device. The first region and the second region can be arranged concentrically on the capacitive touch input device. The capacitive touch input device can comprise a two-dimensional grid of touch-sensitive pixels.

Yet another aspect of the disclosure relates to a touch-sensitive controller, comprising a housing, a touch input assembly supported by the housing, with the touch input assembly including a first button having a first outer surface, a second button having a second outer surface, with the second outer surface being separated from the first outer surface by a gap, a capacitance-sensing input device having an input region overlapping the first and second buttons, wherein the capacitance-sensing input device is positioned at a first depth from the first outer surface and at a second depth from the second outer surface, the first and second distances being different from each other, and a touch controller in electronic communication with the capacitance-sensing input device and configured to continuously track movement of a capacitive load moving across the gap using the capacitance-sensing input device.

The capacitance-sensing input device can include a first portion of the input region corresponding to the first outer surface and a second portion of the input region corresponding to the second outer surface, wherein the first and second portions of the input region are vertically offset from each other within the housing. The first outer surface can comprise a convex curvature and the second outer surface comprises a concave curvature. The capacitance-sensing input device can include a flex circuit having a first portion corresponding to the first outer surface and a second portion corresponding to the second outer surface, wherein the first and second portions overlap each other within the housing. The capacitance-sensing input device can include a first electrode corresponding to the first outer surface and a second electrode corresponding to the second outer surface, wherein the first and second electrodes are non-rectangular. The input region can be rectangular.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
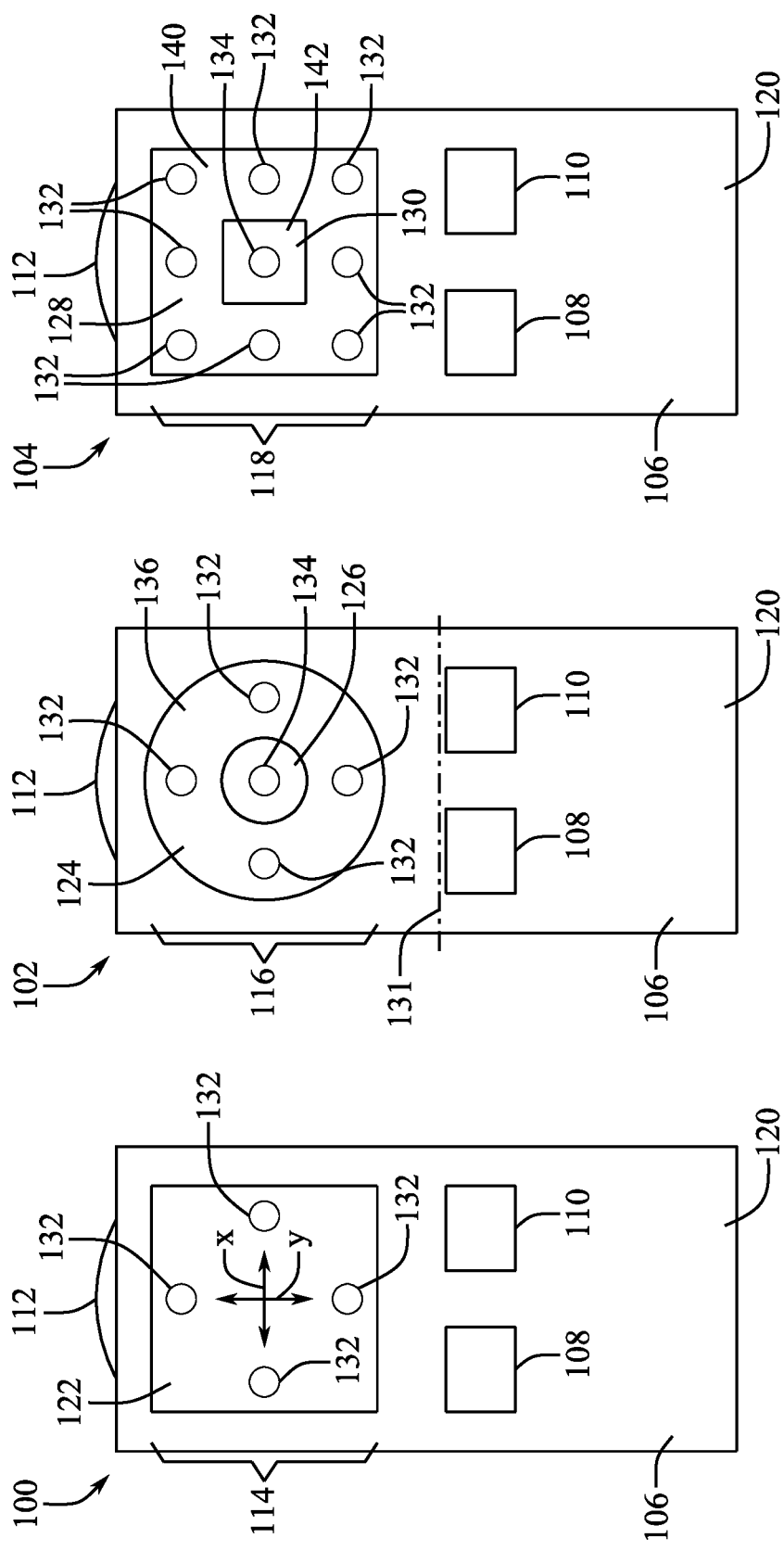
FIGS. 1A-1C show top views of various controller devices.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some embodiments of the present disclosure relate to a remote control device with an input area that is capable of receiving touch input and button/switch-press input in multiple areas on its surface. Thus, embodiments of the present disclosure relate to touch input devices such as trackpads that have multiple functions, including sensing capacitive touch input via a capacitance-sensing input device and sensing electro-mechanical or electronic switch input via switches or other position sensors positioned beneath multiple regions of the trackpad. The touch input device can therefore form multiple buttons (or multiple switch-registering regions of a single button) that, when deflected or depressed, can operate like typical buttons on a controller device while simultaneously, through those same buttons or regions, tracking movement of a capacitive load (e.g., a user's thumb, finger, stylus, other virtual ground, etc.) across those buttons or regions. Thus, using embodiments of the present disclosure, a user can provide input to a controller via two-dimensional touch gestures (e.g., swiping, scrolling, pinching, drawing shapes, etc.) and via button presses (e.g., collapsing a dome or other switch beneath the touch sensing structures) across multiple buttons or designated regions of an input area on the controller.

The multiple buttons or regions of the touch input device can have different tactile surface characteristics (e.g., different surface textures, tactile bumps/recesses, surface curvature, surface smoothness, ridges/grooves, etc.) that enable the user to feel the difference between different portions of the input device while still allowing the user to smoothly move an object/finger across the surface to provide two-dimensional touch gesture input. In some embodiments, multiple buttons have a single capacitance-sensing flex component positioned beneath them, and the component includes multiple interconnected sections that correspond to the positions of at least two of the buttons' outer surfaces. The interconnected sections can be positioned adjacent to each other (or partially overlapping each other) so that a single touch gesture movement, from a first button to a neighboring button across a threshold or gap between the buttons, can be tracked seamlessly, such as if the buttons collectively formed a single track pad. The buttons can have varying thicknesses above the interconnected sections, and touch sensitive pixel regions in each of the interconnected sections can have various shapes and sizes, including non-rectangular shapes (e.g., at least one non-perpendicular angle or curved perimeter edge) and otherwise differing touch-sensitive areas. In some embodiments, multiple separate touch sensing components can be included that are positioned next to each other, wherein the output of the components may be combined to provide tracking of a capacitive load as it moves across the components.

Accordingly, a touch input area of a remote controller can be used as a trackpad while also being usable as a depressible button input area for functions such as directional control (e.g., moving a cursor or input selector up, down, left, right, etc.) and selection control (e.g., identifying a selection using the cursor or input selector). This allows a large number of different inputs to be provided to the remote controller within a small space, thereby permitting the controller to have a simplified appearance, simplified manufacturing, easier to understand operation, and improved ergonomics, among other benefits.

These and other embodiments are discussed below with reference to the figures. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIGS. 1A-1C illustrate various examples of controller devices 100, 102, 104 for providing remote control to another electronic device such as, for example, a separate computing device, a display screen (e.g., television or computer monitor) or a device connected to a display screen (e.g., a digital video disc (DVD) player, a BLU-RAY® player, an augmented reality (AR) device, a virtual reality (VR) device, an internet-connected streaming device (e.g., an APPLE TV®, notebook computer, or desktop computer), a gaming console, similar devices, and combinations thereof). See, e.g., computing device 1142 in FIG. 11 and its related description below. The controller devices 100, 102, 104 can each comprise a housing 106 (i.e., an enclosure or container) configured to be held in the hand of a user and can comprise input buttons 108, 110 for providing input using the user's fingers. For example, the buttons 108, 110 can be pressed by the user to control functions of the computing device, display screen, or other device. For instance, when controlling a television, the buttons 108, 110 can be pressed to change the volume or channel of the television. Although two buttons 108, 110 are shown in each controller device 100, 102, 104, the total number of buttons can be changed to suit the needs of each controller device, such as by providing no buttons 108, 110, one button 108, three buttons, four buttons, etc.

The buttons 108, 110 can be movable relative to the housing 106. Thus, an outer surface of a button 108, 110 can be deflected toward the opposite side of the housing 106 (e.g., the opposite side of the housing 106 as compared to the views of FIGS. 1A-1C), and the pressure applied to the buttons 108, 110 can actuate a switch for each button 108, 110 within the controller device 100, 102, 104 that triggers production of an electrical signal that is transmitted to the electronic device using the controller device 100, 102, 104 as an input device. For example, the controller device 100, 102, 104 can transmit the input signal via a wireless transmission interface 112 which may include an infrared emitter, a radio frequency (RF) emitter, a wireless networking antenna (e.g., a WI-FI®, BLUETOOTH®, cellular network, or similar interface), similar transmission devices, and combinations thereof. See also input device 1140 and remote control 1280 of FIGS. 11 and 12 and their descriptions below.

In some embodiments, the buttons 108, 110 do not move relative to the housing 106 and are instead object-sensitive (e.g., capacitive-load-sensitive) portions of the housing 106 configured to sense a capacitive load or object brought into proximity of the area of a button at or near the surface of the housing 106. Other types of buttons 108, 110 can also be used, such as knobs, keys, mechanisms, sliders, rockers, similar devices known in the art, and combinations thereof.

Each controller device 100, 102, 104 can also comprise an input pad 114, 116, 118. Each input pad 114, 116, 118 can be positioned adjacent to, but separate from, the other input buttons 108, 110. Each input pad 114, 116, 118 can be positioned near an end of the housing 106, such as at an end of the housing 106 configured to be positioned at or under the end of a thumb or forefinger of a user's hand while the user grasps a handle end 120 of the controller device 100, 102, 104 and orients the wireless transmission interface 112 toward the electronic device being controlled. In some embodiments, the wireless transmission interface 112 is non-directional and can transmit a signal to a controlled device irrespective of the orientation of the housing 106 or interface 112 (e.g., BLUETOOTH® or WI-FI®). Thus, the input pad 114, 116, 118 can be configured to receive input from a finger of a hand of a user while the same hand grasps and holds the opposite end 120 and, potentially, other portions of the housing 106 with the remaining fingers of that hand. In some embodiments, this means the input pad 114, 116, 118 is positioned entirely on one side of a halfway point (e.g., past middle line 131 in FIG. 1B) along the length of the housing 106. In some configurations, the controller device can be configured to be held with two hands, wherein the fingers of each hand are positioned behind the device and the thumbs are used to operate buttons 108, 110 and input pad 114, 116, 118.

In some embodiments, the size of the input pad 114, 116, 118 can be configured to allow the user to slide an input-providing finger across the outer surface 122, 124/126, and 128/130 in two directions (e.g., along axes x and y in FIG. 1A) without the input-providing finger moving out of the maximum perimeter of the input pad 114, 116, 118. The tip of a human finger is about 0.6 inches along the x-axis and 0.6 inches along the y-axis, so the input pad 114, 116, 116 can have dimensions of least about 1.8 inches along the x-axis (to permit the finger to comfortably press three side-by-side buttons) and about 1.8 inches along the y-axis (for the same reason). Furthermore, as described in further detail below, each input pad 114, 116, 118 can be used to sense two-dimensional gesture input from a user object (e.g., finger) moving across an outer surface 122, 124/126, or 128/130 of an input pad 114, 116, 118.

Each input pad 114, 116, 118 can also have a set of button regions 132, 134 where the input pad 114, 116, 118 is configured to be pressed to actuate a switch in the housing 106 underneath the input pad 114, 116, 118, which switches are discussed in further detail below. Input pad 114 has four button regions 132 allowing inputs such as up, down, left, and right directional input via the input pad 114. Input pad 116 has four outer button regions 132 on a ring-shaped portion 136 (i.e., a ring-shaped button) of the input pad 116 that can provide similar directional input and a central button region 134 in a central portion 138 (i.e., a central button) for an additional input, such as, for example, a selection input or a menu input. Input pad 118 has eight outer button regions 132 on a square-shaped portion 140 with a central portion 142 positioned centered within the square-shaped portion 140 and having a central button region 134. In some configurations, input pad 114 can deflect or compress relative to the housing 106 when the button regions 132 are pressed and internal switches actuate, as further discussed below. In some embodiments, input pad 116 has its ring-shaped portion 136 and the central portion 138 formed as a single integral piece, and in some cases, the ring-shaped portion 136 and the central portion 138 are two independently movable pieces (relative to each other and the housing 106) or are joined by a flexible joint that allows them to be installed as a single piece but that allows one portion to move relative to the other after installation. Principles of these embodiments can be applied to other embodiments shown in other figures.

Figure 2:
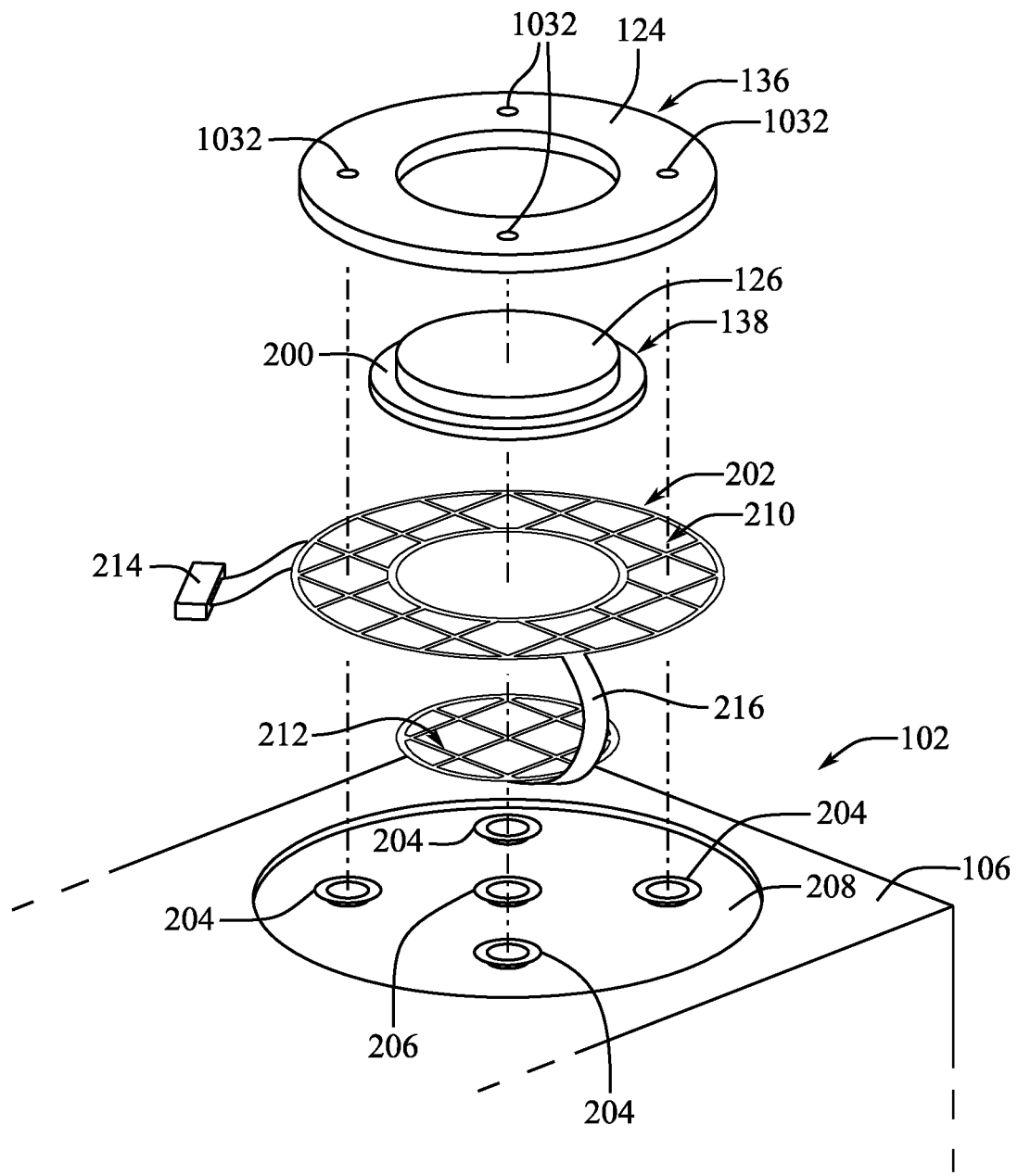
FIG. 2 shows an exploded orthographic view of a controller device at an input area.

FIG. 2 illustrates an exploded orthographic view of an embodiment of controller device 102 having features that are applicable to other embodiments disclosed herein. This controller device 102 has an input pad 116 with a ring-shaped portion 136 that is a separate piece from the central portion 138. The ring-shaped portion 136 and central portion 138 are concentrically aligned with each other, and the ring-shaped portion 136 at least partially overlaps a flange 200 of the central portion 138. The flange 200 can prevent debris from passing between the portions 136, 138 of the input pad 116 and into the housing 106. The ring-shaped portion 136 and central portion 138 both are positioned above a capacitive touch input device 202 and a set of switches 204, 206. These parts 137, 138, 202, 204, 206 are all configured to be positioned in a cavity 208 in the housing 106 and can be collectively referred to as a touch input assembly or a hybrid input assembly because they are operable to receive capacitive load-based input (e.g., taps and gestures) and switch-based input (e.g., as triggered by actuation of the switches 204, 206).

The switches 204, 206 can comprise various actuatable electrical or electromechanical switch mechanisms configured to transduce movement of at least a portion of the input pad 116. The switches 204, 206 can include devices such as, for example, collapsible domes (e.g., made of metal, rubber, or a similar flexible material), springs, or flexible, movable contacts. In some embodiments, the switches 204, 206 can include capacitance sensors configured to sense the position of the input pad 116 relative to a housing 106 or a sensor device by measuring a capacitance that changes in response to movement of the input pad 116, such as a capacitance between a first capacitor plate on the input pad 116 and a second capacitor plate on the housing 106. In some embodiments, the switches 204, 206 can comprise a Hall-effect sensor usable to measure movement of the input pad 116 based on changes to a magnetic field resulting from movement of the input pad 116. For instance, a magnet can be attached to the input pad 116 or housing 106, and the Hall-effect sensor can be positioned on the opposite structure to sense movement of the magnet relative to the Hall-effect sensor.

The capacitive touch input device 202 can be referred to as a touch flex, a touch sensor, a flexible circuit board having capacitance sensors, a substrate, a sensor substrate, or a capacitance-sensitive input device. In some embodiments, the capacitive touch input device 202 can comprise a dielectric substrate with a conductive layer (e.g., copper) coated thereon. The copper layer can optionally be etched and adhered to another dielectric substrate with an etched copper layer. This process can be repeated until the desired number of copper/conducting layers is reached for proper functionality of the touch input device 202. The capacitive touch input device 202 can therefore be referred to as a layered substrate or a multi-layered substrate, and the layers can be used to provide electrical connectivity between various sensors and switches of the capacitive touch input device 202 which are described in further detail below.

The capacitive touch input device 202 can have a set of capacitive touch input regions 210, 212 on an at least partially flexible substrate 400. See FIG. 4. Outer touch input region 210 is annular shaped with a central opening and is non-overlapping with non-conductive rings 312-*a* and 312-*b* on the substrate 400. Inner touch input region 212 is circular shaped and is non-overlapping with non-conductive ring 312-*c* on the substrate 400. The substrate 400 can have a connector 214 configured to provide electrical communication between the capacitive touch input device 202 and an electrical controller or control logic board of the controller device 102, such as control system 1150 or processor 1157 in FIG. 11 or IR controller 1290 in FIG. 12, as described further below. The touch input regions 210, 212 can be connected to each other by a flexible connector portion 216 of the substrate 400.

Figure 3:
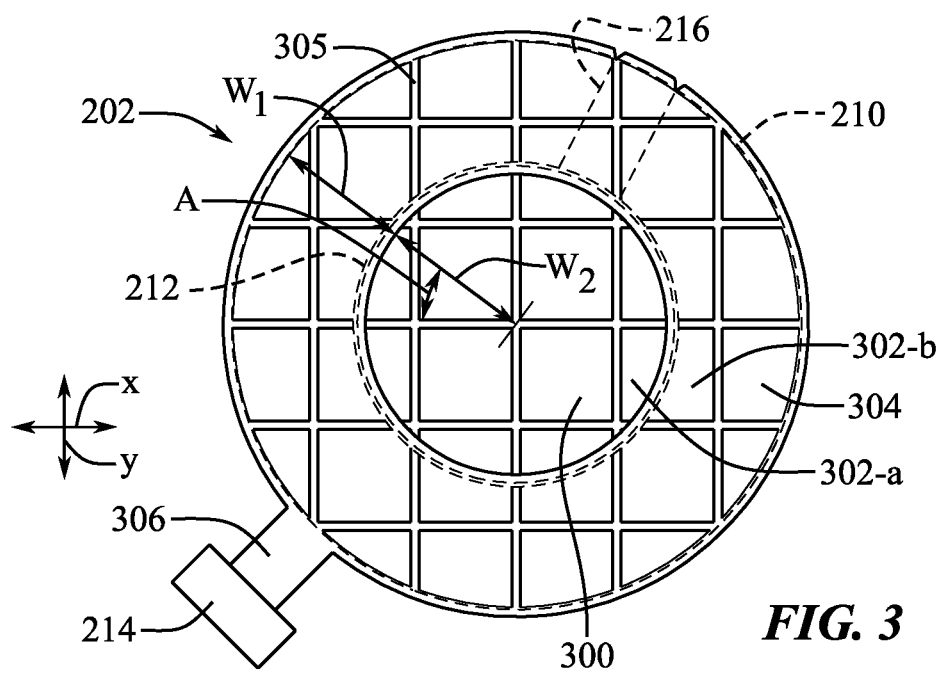
FIG. 3 shows a top view of a capacitive touch input device in a folded configuration.
Figure 4:
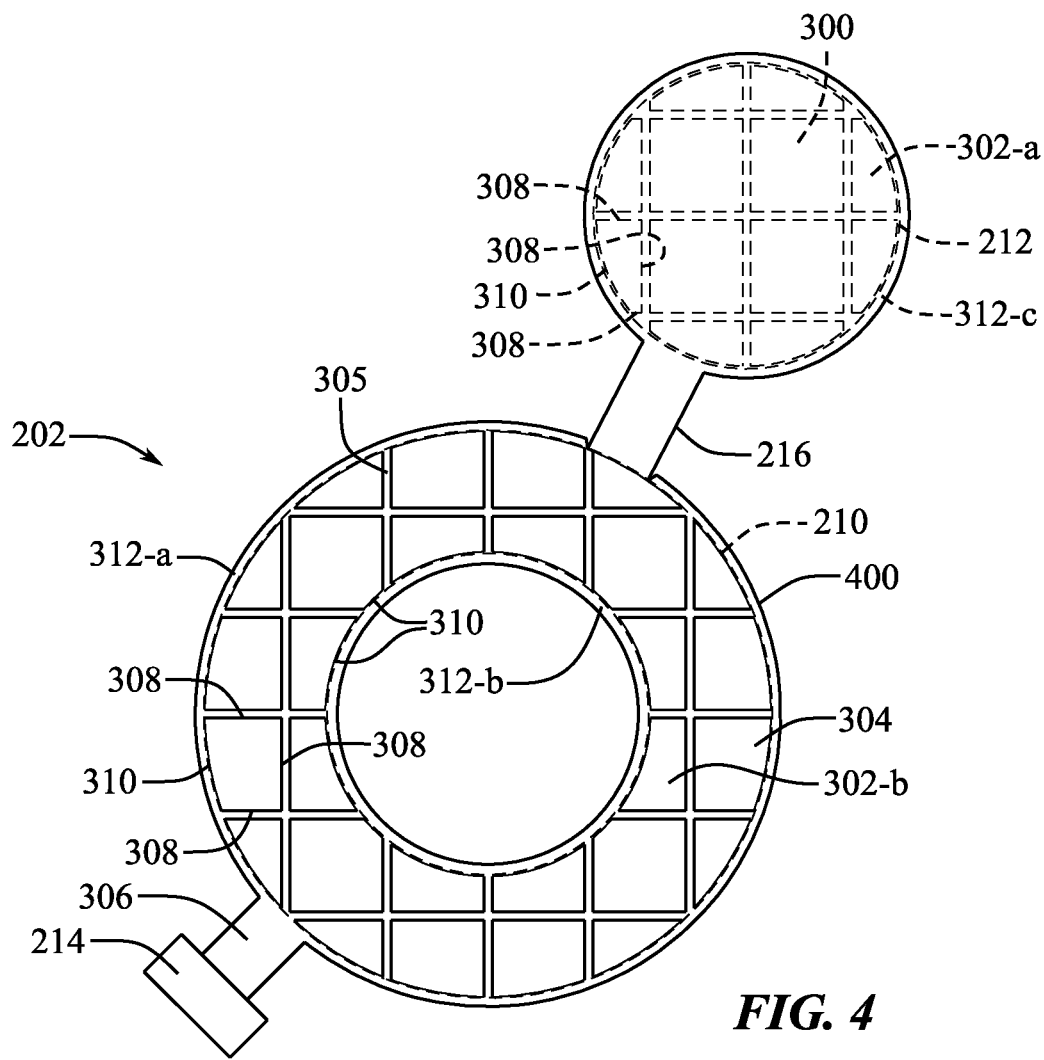
FIG. 4 shows a top view of the capacitive touch input device of FIG. 3 in an unfolded configuration.

FIG. 3 shows a top view of the capacitive touch input device 202 with the touch input regions 210, 212 concentrically aligned with each other (i.e., with the flexible connector portion 216 folded under the outer touch input region 210). As seen by comparing FIGS. 3 and 4, the outer touch input region 210 can have an inner edge that is vertically aligned with the outer edge of the inner touch input region 212 when the inner touch input region 212 is positioned below and centered relative the opening of outer touch input region 210 (e.g., they are coaxially aligned). See also FIGS. 5 and 5A, wherein boundary B aligns with the inner edge of touch outer input region 210 and the outer edge of inner touch input region 212, as explained in further detail below. FIG. 4 shows a top view of the touch input device 202 with the flexible connector portion 216 unfolded so that the inner touch input region 212 is facing downward/away from the viewer, and the outer touch input region 210 is facing upward. Thus, FIG. 4 shows that the outer touch input region 210 is positioned on a first side of the substrate 400 of the capacitive touch input device 202 (i.e., the upward-facing side when the device 202 is unfolded), and the inner touch input region 212 is positioned on a second, opposite side of the capacitive touch input device 202 (i.e., the downward-facing side when the device is unfolded).

The touch input regions 210, 212 can each be sized and positioned relative to each other to correspond to the horizontal positions of the ring-shaped portion 136 and central portion 138 of the input pad 116, respectively. Thus, the ring-shaped portion 136 can overlay the outer touch input region 210 and can substantially entirely overlap the surface area of the outer touch input region 210. The central portion 138 can similarly overlay the area of the inner touch input region 212. In like manner, a capacitive touch input device used with input pad 114 or 118 can have one or more touch input regions that would correspond to the square surface 122 or square surfaces 128, 130 of those input pads 114, 118. Capacitive touch input devices of various other surface shapes can be adapted to match or substantially match the shapes of input pads with various other surface shapes.

In some embodiments, one or more layers of adhesive, such as pressure sensitive adhesive (PSA), can be positioned between these separate layers 136, 138, 210, 212 to keep them attached to each other and to ensure that the distance between the bottom surfaces of the input pad portions 136, 138 and the top surfaces of the touch input regions 210, 212 remains constant as the input pad 116 is touched and pressed. See FIG. 5 and its related descriptions below. As shown in FIG. 4 the outer perimeter of the outer touch input region 210 can be slightly smaller than the outer perimeter of the substrate 400 on which it is positioned, and the inner perimeter of the outer touch input region 210 can be slightly larger than the inner perimeter of the substrate bearing the outer touch input region 210, as indicated by non-conductive rings 312-a and 312-b which surround the outer touch input region 210 on the inside and outside of the ring. The substrate portion holding the disc-shaped inner touch input region 212 can have an outer perimeter slightly larger than the outer perimeter of the inner touch input region 212, as shown in FIG. 4 and in ring 312-c. See also FIGS. 3, 5, and 5A. Thus, the substrate can comprise a portion (i.e., ring 312-c) that is slightly larger than another portion (i.e., ring 312-b) and that ensures that adjacent edges of the touch input regions 210, 212 vertically align with each other when the regions 210, 212 are concentrically aligned.

As shown in FIGS. 3-4, the touch input regions 210, 212 collectively form a grid-shaped set of electrodes such as electrodes 300, 302-a, 302-b, 304, etc. with boundaries defined by gridline-shaped non-conductive material 305 that spaces apart neighboring electrodes (e.g., 302-b, 304) from each other. The set of electrodes can be referred to as a set of capacitance sensors, sensor pads, touch sensor "pixels," electrically conductive nodes, subdivided input regions, etc. The electrodes can comprise conductive material (e.g., copper) printed on or adhered to the substrates (e.g., dielectric material) of the capacitive touch input device 202, and can each be connected to conductive traces extending through the capacitive touch input device 202 to the connector 214 via the flexible connector portion 216 and tail 306. In some embodiments, traces can be configured to permit multiplexing or logical combinations of the electrodes, as understood by those having skill in the art and having the benefit of the present disclosure.

The touch input regions 210, 212 of input pad 116 do not have square outer perimeters, so some electrodes can be entirely square (e.g., 300) and some (or all) electrodes can have edges that are at least partially square and at least partially non-square, curved, angled, etc. (e.g., electrodes 302-a, 302-b, 304). In other words, electrodes can have edges (e.g., edges 308 in FIG. 4) defined by square-shaped gridlines/gaps of non-conductive material 305 extending across the surfaces of the touch input regions 210, 212 while the touch input regions 210, 212 are concentrically aligned with each other (i.e., in the positions shown in FIGS. 2 and 3). The electrodes can also have edges (e.g., 310 in FIG. 4) defined by an inactive/non-conductive material region (e.g., rings 312-a, 312-b, and 312-c in FIG. 4) extending around the outer or inner perimeter of the touch input regions 210, 212 on which they are located. In some embodiments, the electrodes can have non-squared edges that extend to the edges or outer circumferences of the touch input regions 210, 212 in which they are located.

Accordingly, various electrodes can have different surface areas that cause each electrode (or certain groups of electrodes) to have different sensitivity to changes in capacitance or electric field of a capacitive load (e.g., a finger) positioned near or in contact with the input pad 116. Some electrodes (e.g., those in touch input region 212) can also be positioned at a different vertical offset from the outer surface of the input pad 116 as compared to other electrodes (e.g., those in touch input region 210) due to overlapping/vertical offset between portions of the capacitive touch input device 202. See FIG. 5 and related description below. Furthermore, the vertical thickness and material construction of the ring-shaped portion 136 can differ from the thickness and material construction of the central portion 138, and thicknesses of subdivided portions of each portion 136/138 can vary, such as when their structures have top surface curvature, as explained in further detail below. Those thicknesses, positions, and material constructions can therefore cause varying degrees of attenuation of the sensed capacitive load/electric field emitted at the input pad 116 and can cause electrodes, even ones having equal sizes, to provide different outputs in response to equal capacitive loads.

Embodiments of the present disclosure can compensate for the attenuation and variation caused by the dimensions and materials of the input pad 116 and by the shapes and sizes of the electrodes to enable two-dimensional capacitive touch input across the input pad 116. In other words, the output of the electrodes can be provided to a control system of the controller device 102 which can sense the movement of a capacitive load across the input pad 116 as the load moves over a portion of the non-conductive material 305, 312 in a first direction across a plane of the capacitive touch input device 202 (e.g., parallel to the x-axis in FIG. 3), as it moves in a second direction across that plane (e.g., parallel to the y-axis in FIG. 3), and along multiple directions (e.g., partially along both the x-axis and the y-axis). This also means that the output of the electrodes can be used to identify a point on the touch input regions 210, 212 where the capacitive load is being applied, such as, for example, a two-dimensional coordinate for that point relative to an origin point (e.g., the center of the input pad 116) and to track the movement of the capacitive load as it moves in just one lateral direction (e.g., parallel to the x- or y-axis) anywhere on the input pad 116.

Other touch input pads, especially circular-shaped ones, have a one-dimensional array of electrodes only capable of determining a position of a capacitive load based on its angular position relative to a center point rather than being capable of detecting radial movement or movement in a two-dimensional array of electrodes. Such devices also can only detect movement along a single axis (e.g., parallel to an x-axis) at certain sections of the input device (e.g., only at the top and bottom sections of the input pad) rather than anywhere on the input device (i.e., they cannot detect x-direction movement at the left and right sections).

The output of the electrodes of the capacitive touch input device 202 can also be used to identify a position of a capacitive load using radial coordinates, such as by being measured along a radial direction (e.g., along widths $W_1$ or $W_2$ in FIG. 3) and with an angle relative to an origin axis (e.g., the angle A). The electrode output can be used to track movement of the point along the radial direction and as the angle (e.g., A) changes. This beneficially enables fully two-dimensional, trackpad-like capacitive touch sensing at the input pad 116 even though the individual electrodes are not all equally sized or shaped. Conventional circular touch input pads can only use a one-dimensional input array to detect angular position, making radial movement tracking impossible.

The foldability of the capacitive touch input device 202 enables the inner and outer touch input regions 210, 212 to be formed on a single substrate 400 for simplified construction and assembly. This also allows different parts of the substrate 400 to be attached to different parts of the input pad 116 (e.g., separate surfaces of the ring-shaped portion 136 and central portion 138) or separate buttons (e.g., when the ring-shaped portion 136 and central portion 138 are separate, independently movable structures) so that movement of one part (e.g., region 210) of the substrate 400 does not cause movement of a second part (e.g., region 212) and vice versa. In other words, the regions 210, 212 can vertically move independent of each other.

Figure 5:
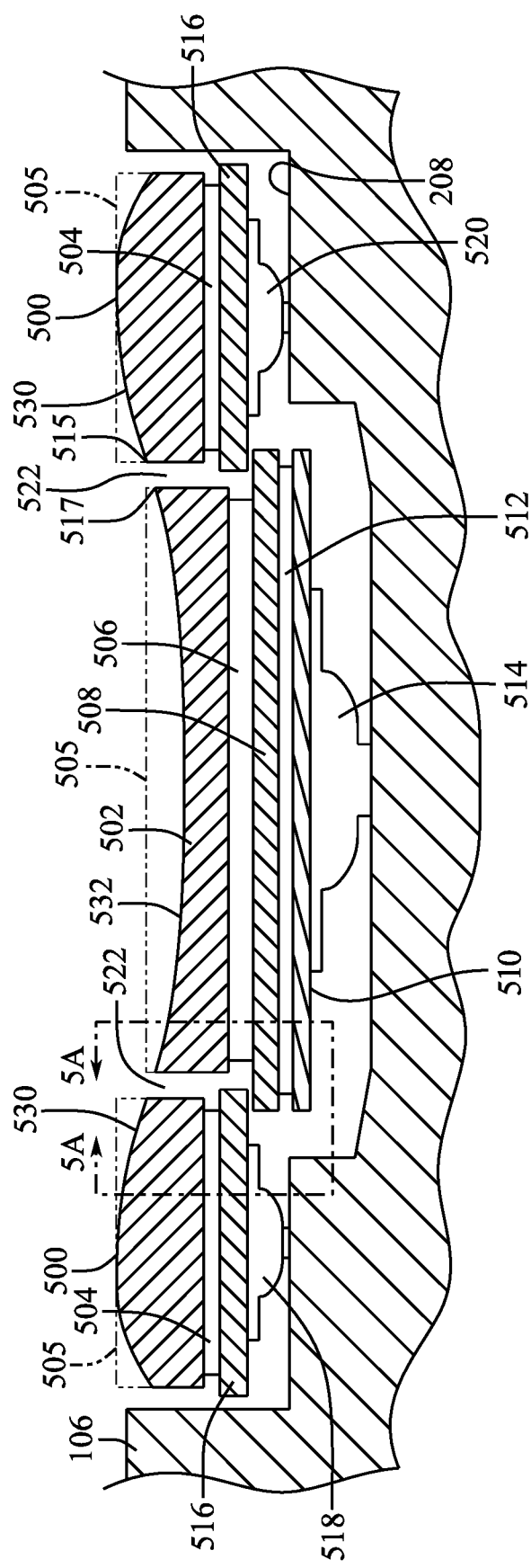
FIG. 5 shows a side section view of an input area of a controller device.

FIG. 5 shows an example side section view of the touch input assembly and housing 106 taken centrally through the cavity 208. Key-like structures of a ring-shaped platform 500 (similar to 136) and central platform 502 (similar to 138) are positioned above layers of adhesive (e.g., pressure-sensitive adhesive (PSA) layers 504, 506). The central platform 502 is adhered to a carrier structure 508 using PSA 506. Carrier structure 508 is adhered to a central substrate 510 using another layer of PSA 512. A switch 514 is positioned below the central substrate 510 and between the substrate 510 and a wall of the housing 106. The ring-shaped platform 500 is adhered to a ring-shaped substrate 516 to which a set of switches 518, 520 are connected on opposite sides thereof. Those switches 518, 520, are positioned below the ring-shaped substrate 516 and between the substrate 516 and the housing 106. It is noted that FIG. 5 is simplified and not to scale. Thus, additional components, such as an additional layer below the switches 514, 518, or 520, can be added, components can be attached to the housing 106 between the switches and the cavity 208, additional switches can be added, some switches can be removed, etc.

In some embodiments, the ring-shaped platform 500 and the central platform 502 can comprise a rigid material such as glass or plastic. In some embodiments, they can each comprise different materials. The carrier structure 508 can beneficially be used to reinforce the central platform 502, such as when the central platform 502 is very thin and breakable (e.g., when it is glass). In some embodiments, the central platform 502 can be formed as a single integral piece with the carrier structure 508, in which case the PSA 506 can be omitted.

The ring-shaped substrate 516 and the central substrate 510 can be electrically connected to each other or can be part of a single substrate, similar to how touch input regions 210, 212 are part of substrate 400. In some embodiments, the substrates 510, 516 can be separate parts with their own individual connectors (like 214). Both substrates 510, 516 can be touch sensitive and can comprise arrays of electrodes and can collectively form an array of electrodes similar to the arrays shown in FIG. 2-4, 6, or 7.

The top surfaces 530, 532 of the ring-shaped platform 500 and central platform 502 can be formed with curvature as shown in FIG. 5. In an example embodiment, the ring-shaped platform 500 can have a convex top surface curvature, and the central platform 502 can have a concave top surface curvature. As shown in broken lines, the top surfaces of the platforms can also be substantially flat and planar with different heights or vertical positions relative to the housing 106. The difference in heights can provide a tactile boundary between the platforms so that the user can feel where one button ends and the other begins. In some embodiments, the top surfaces are planar (see FIG. 9) or part of a single integral piece (see FIG. 8).

The top surfaces of the platforms 500, 502 can be configured to provide tactility based on their curvature (e.g., different parts having concave vs. convex surfaces), texture (e.g., rough vs. smooth surfaces), tactile surface features (e.g., tactile nubs/bumps/grooves/ridges/recesses vs. no bumps or different feeling surface features), surface friction (e.g., lower friction surface material or texture vs. higher friction surface material or texture), similar elements, and combinations thereof. The top surfaces can beneficially be defined nearly continuously or with substantially small (e.g., about 0.5 mm to about 0.8 mm) gaps or ridges between platform top surfaces (see, e.g., gaps 522 in FIGS. 5 and 5A), so that the user's finger can smoothly move across the top surface without being caught on a ridge or bump that could significantly interfere with the movement flow of a gesture being provided to the top surface of the platforms 500, 502. In some embodiments, a corner edge 515 of outer top surface 530 can be positioned at a substantially equal vertical height (as measured relative to the bottom of the cavity 208) as a corner edge 517 of the inner top surface 532. Additionally, embodiments can have top surfaces with indicators (e.g., visual or tactile indicators) that indicate to a user the location(s) under the top surfaces where switches (e.g., 514, 518, 520) are located so that the user can more easily find and trigger those switches when desired. See also FIG. 10.

Applying downward pressure to a platform 500, 502 can cause deflection of the platform 500, 502 and the components adhered to the bottom of it (e.g., 506, 508, 510, 512 or 504, 516) toward or into the cavity 208 and bottom surface of the housing 106. This deflection can trigger actuation of a switch 514, 518, 520 below where the downward pressure is applied. The switches 514, 518, 520 can beneficially include collapsible domes that are configured to bias the platforms 500, 502 in a direction pointing out of the housing 106 so that when the downward pressure is removed, the platform 500, 502 can return to a default or rest position like the positions shown in FIG. 5.

When the downward pressure is applied, the domes can collapse to a reduced vertical height. In some embodiments, the switches 514, 518, 520 can be configured to close an electrical circuit or make electrical contact with conductors (e.g., conductive traces) positioned on and extending through the central substrate 510 or ring-shaped substrate 516. Thus, actuation of a switch (e.g., collapsing a dome) can cause an electrical make that triggers a signal to be generated at a control system of the controller device via a connector (e.g., 214). In some embodiments, at least some switches 514, 518, 520 can cause electrical make by triggering a signal in a substrate or circuit board positioned below the switches 514, 518, 520 in the housing 106 that is separate from the central substrate 510 or ring-shaped substrate 516. Each switch 514, 518, 520 can provide a distinguishable, different signal to the control system so that the control system can transmit a control signal to the remote electronic device corresponding to a specific switch's intended function (e.g., moving a cursor left, right, up, or down, changing a television channel up or down, changing brightness levels, volume levels, etc.).

Application of a downward pressure to the platform 500, 502 can cause one side of the platform (e.g., the left side of platform 500 in FIG. 5) to tilt downward as the switch 518 below it collapses and while a switch 520 on the opposite side (e.g., the right side in FIG. 5) remains substantially in the same vertical position. Additionally, the strength of the switches 514, 518, 520 can be designed to require a threshold amount of downward pressure to be exceeded before a switch starts to collapse. In other words, downward pressure below a threshold value that is applied above a switch can be insufficient to actuate the switch (e.g., when sliding touch/gesture input is provided to the top surface), and applying downward pressure at or above the threshold value can cause the switch to actuate. Additionally, upon sensing actuation of the switch, a control system connected to the capacitive touch input device can disable the system from sending gesture input signals until the downward pressure is released. This can help the system avoid misinterpreting a "button click" switch actuation action provided by the user as a sliding touch gesture input action provided by the user.

As shown in FIG. 5, the ring-shaped platform 500 and central platform 502 can be separate parts with a gap 522 extending around the perimeter/circumference of the central platform 502 and around an inner perimeter/circumference of the ring-shaped platform 500. This allows the central platform 502 to have a small amount of surrounding space that allows it to move vertically and laterally and to rotate/roll slightly relative to the ring-shaped platform 500. This can enable a greater travel distance of one platform relative to another when the user depresses one platform with a downward force.

Figure 5A:
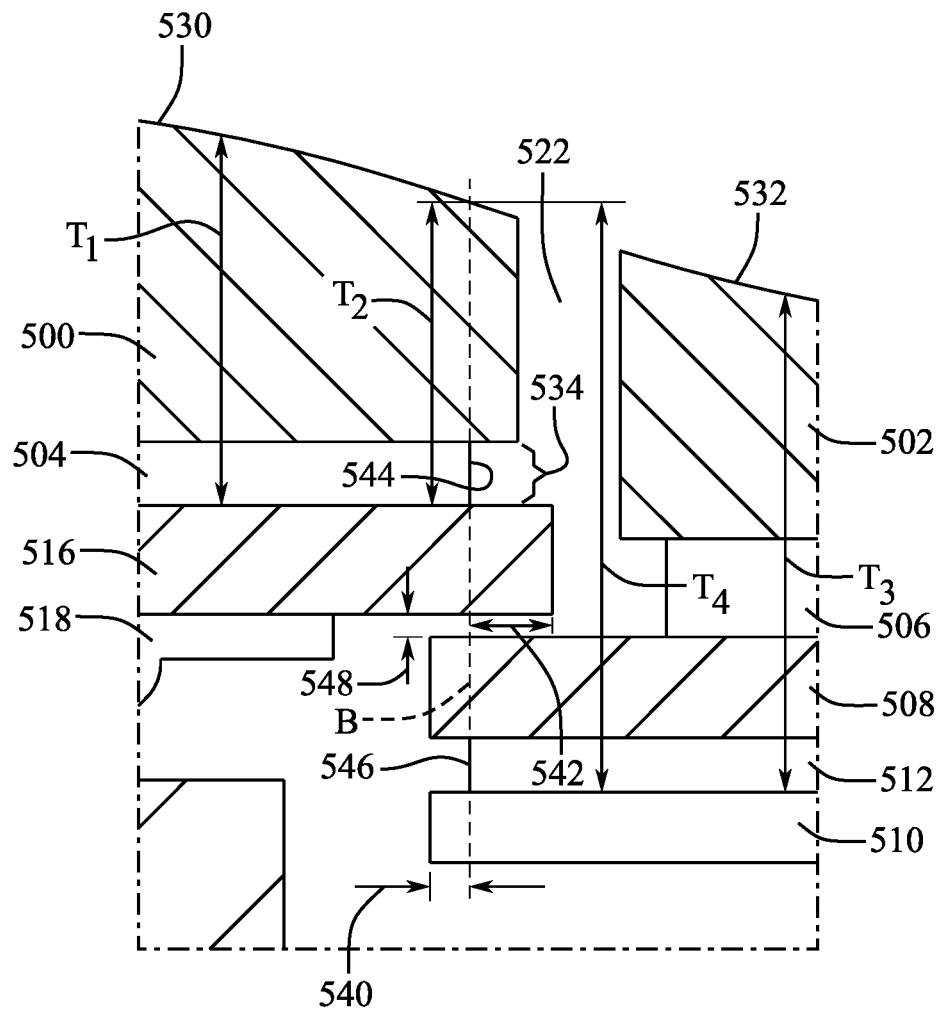
FIG. 5A shows a detail view as indicated by detail indicator 5A in FIG. 5.

FIG. 5A shows a detail view of the portions of the controller device where the platforms 500, 502 and the components underneath them are positioned adjacent to each other, as indicated by detail indicator 5A in FIG. 5. This view shows how the top surfaces 530, 532 of the platforms 500, 502 are separated from each other by the gap 522, but that the top surfaces 530, 532 have top surface curvatures that align with each other on each side of the gap 522 to along a continuous surface spline. This view also indicates how the thickness of the stack-up of components (i.e., 500, 504) above the substrate 516 differs due to that curvature of the top surface 530, wherein a thickness $T_1$ between the substrate 516 and the top surface 530 and a thickness $T_2$ between the substrate 516 and the top surface 530 differ from each other. In this embodiment, $T_1$ is greater than $T_2$ because of the downward slope or curvature of the top surface 530. This difference in thicknesses can cause variation in the attenuation of a capacitive load or electric field signal measured by electrodes on the top surface of the substrate 516.

Generally, more material and longer distance between the capacitive load and the electrode weakens the strength of the signal, and less material and shorter distance relatively strengthens the signal. Accordingly, two identical electrodes, such as one under $T_1$ and one under $T_2$, can detect the same load at the top surface 530 yet produce two different output signals. Accordingly, a control system receiving the signals of the two electrodes can be programmed (e.g., with instructions for processor 1157 stored using program storage area 1162 in FIG. 11, as explained below) to compensate for the difference in signals caused by material and distance attenuation at $T_1$ and $T_2$ so that the control system can reliably detect the position of the capacitive load relative to the two electrodes. Otherwise, the control system could be biased to detect the capacitive load as being closer to the electrode under $T_2$ because that electrode would produce a stronger signal in most conditions. Similarly, an electrode can be positioned under thickness $T_3$ which would have different attenuation because of inclusion of the carrier structure 508, additional PSA 506, and different thickness or material at platform 502.

Therefore, in some embodiments, the control system can implement a method of applying a correction factor to each signal processed from each electrode in the capacitive touch input device, and the correction factor can be determined and tuned based on the amount of correction needed at each electrode, as influenced by thickness of material over the electrode, distance between the position at which a capacitive load is applied (e.g., the thickness of overlaying material on the electrode up to the top surface), material variations (e.g., the variation in attenuation caused by the transition from the platform 500 having PSA 504 below the bottom of the platform 500 and having an air gap 534 below the bottom of the platform 500), the shape and size of the electrode, similar factors, and other factors discussed herein.

In order to determine a correction factor to apply to each electrode, a method of the present disclosure includes application of a consistent capacitive load across the entire top surfaces (e.g., 530, 532) of the platforms 500, 502 (e.g., in a controlled environment). In other words, the consistent capacitive load can be applied with equal magnitude at all points across the top surfaces 530, 532. The electrode outputs under this loading can then be measured. For example, a large electrode under a thin overlaying button material (e.g., 300) may output a signal magnitude of 1000, another electrode that is smaller and under a thin button material (e.g., 302-a) may output a signal magnitude of 300, another electrode that is moderately sized and under a thicker button material (e.g., 302-b) may output 650, and another electrode that is moderately sized and under the thickest button material (e.g., 304) may output 500. In this simplified example, a correction factor would be calculated for each of the electrodes based on these output levels so that they would all output a signal proportional to their surface areas and proportional to the other attenuating effects on their outputs. In effect, this can cancel out the attenuation caused by the overlaying button material thickness, distance from the capacitive load, and other factors while enabling each electrode to function as if it was part of a uniform grid of electrodes. For example, multiple side-by-side electrodes that collectively form a surface area equal to one whole square electrode (e.g., 302-a plus 302-b) can have their combined signal level equal to the output of a whole square electrode 300 of equivalent size and with compensated attenuation. Other electrodes around the circumference of the touch input device (e.g., 304) can have their signals modified to ensure they are not "overweight" or otherwise outputting a signal that is not proportional to their size and position in the overall array of electrodes.

The position of a capacitive load can be determined by collecting output signals from many (e.g., all) electrodes on the capacitive touch input device and, through application of formulae and algorithms known in the art, calculating a position of a center point of the load based on those outputs. For example, if four center square electrodes in touch input region 212 all produce an equal, relatively high output signal as compared to the rest of the electrodes in the input regions 210, 212, the center point can be calculated at the center of those electrodes (i.e., at the center of touch input region 212). This calculation would potentially become error-prone if the load is positioned near the boundary between the touch input regions 210, 212, but by applying a correction factor to the electrodes as discussed above, multiple electrodes (e.g., 302-a, 302-b) can be substantially treated as a single, combined electrode, and smaller electrodes (e.g., 304) can be treated appropriately (e.g., proportionally) based on their shape and positioning. As a result, the position or movement of a capacitive load can be determined at any point across the two-dimensional surfaces of the touch input regions 210, 212 after accounting for the variation in signal sensing caused by overlaying material thickness, overlaying material variations, varying distance from the surface at which the load is applied, and the size, shape, and positioning of the electrodes themselves.

Referring again to FIG. 5A, the ring-shaped substrate 516 and central substrate 510 can be positioned at different vertical levels within the housing 106. This difference can be necessary due to differences in the desired positions of the outer surfaces 530, 532. Additionally, their vertical levels can differ in order to allow the substrates 510, 516 to overlap each other at the outer perimeter of the central substrate 510 and at the inner perimeter of the ring-shaped substrate 516. Electrodes on the substrates 510, 516 may not extend to the outer edges of the substrates 510, 516 (e.g., as shown by non-conductive material rings 312-a, 312-b, and 312-c). In order to improve sensing effectiveness of the electrodes (e.g., eliminating dead zones or other sensing discontinuities as a capacitive load moves across the input pad), the electrodes on the substrates 510, 516 can be configured to have substantially equal amounts of non-conductive material between each square region of the overall/combined array of electrodes.

In embodiments where the substrates 510, 516 do not overlap, the outer edges of the substrates (e.g., at 312) would make lateral gaps between electrodes (e.g., between 302-a and 302-b) that may interfere with continuous, smooth detection of a capacitive load as it moves over the edges of the substrates. However, in embodiments where the substrates 510, 516 overlap, the non-electrode-bearing outer edges (e.g., across widths 540, 542 in FIG. 5A) can be positioned above or below usable, electrode-bearing portions of the substrates 510, 516, thereby ensuring that as a capacitive load moves across a boundary B (which is at the inner edge of an electrode (e.g., 302-b) on substrate 516 and is also at the outer edge of an electrode (e.g., 302-a) on substrate 510), it consistently remains above and aligned with one of the electrodes on at least one of the substrates rather than moving over a position where only a non-electrode-bearing zone (e.g., 540, 542) would be below the load momentarily. The system can therefore permit smooth transition from an electrode of the ring-shaped substrate 516 at thickness $T_2$ to an electrode of the central substrate 510 at thickness $T_4$ on each side of PSA edge boundary B even though the edges of the substrates 510, 516 do not bear electrodes.

Additionally, the overlapping substrates 510, 516 can be configured to reduce the effects of attenuation due to variations in material composition overlaying the electrodes by aligning the inner edge 544 of the PSA 504 of the ring-shaped substrate 516 with the outer edge 546 of the PSA 512 of the central substrate 510. In this way, there are fewer transitions between different layered material compositions and vertical air gaps, which can be difficult to compensate for when determining correction factors, can be minimized.

The overlapping substrates can also be configured with a vertical gap 548 between the bottom of the lowest part of the outer ring stack-up (e.g., the bottom of substrate 516) and the top of the vertically next nearest part of the central portion stack-up (e.g., the top of the carrier structure 508). This vertical gap 548 can permit vertical deflection of the outer ring stack-up without the outer ring stack-up causing vertical deflection of the central portion stack-up (or causing reduced or limited deflection thereof). The size of the gap 548 is not to scale and can be determined based on the amount of deflection needed for the outer ring stack-up to actuate a switch (e.g., 518).

Figure 6:
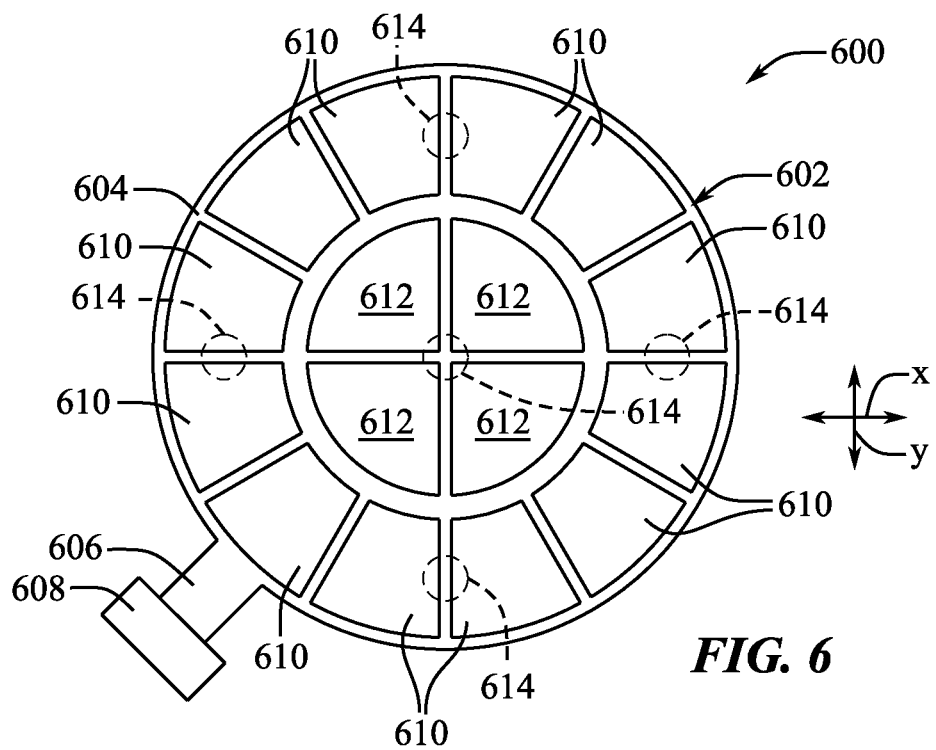
FIG. 6 shows a top view of another capacitive touch input device.

FIG. 6 illustrates a top view of a capacitive touch input device 600 illustrating additional features and principles that can be applied to or combined with other embodiments disclosed herein. The capacitive touch input device 600 includes a substrate 602 comprising a circular portion 604, a tail 606 extending from an edge of the circular portion 604, and a connector 608 at the end of the tail 606. The connector 608 can be used to connect the touch input device 600 to a control system of a controller device similar to the other connectors described herein. The substrate 602 can include a set of perimeter electrodes 610 that surround a set of central electrodes 612. As with other substrates disclosed herein, the electrodes 610, 612 can have non-conductive material positioned between and spacing apart their edges from each other. All of the electrodes 610, 612 can be connected to a set of conductors (not shown) extending through the substrate 602 to the connector 608 so that an output signal for each electrode 610, 612 (or multiplexed combinations of electrodes) can be provided via electrical communication to a control system.

In this embodiment, the perimeter electrodes 610 are configured in a one-dimensional circular array that can be used to detect an angular position of a capacitive load applied near the electrodes 610 around the area of the substrate 602 occupied by the perimeter electrodes 610. Accordingly, movement of the capacitive load across the perimeter electrodes 610 can be sensed and converted into a calculated position including only angle information or information corresponding to an angle representing the position of the load relative to a reference origin (e.g., the 12:00 position between the top two electrodes in FIG. 6). For example, the position of the capacitive load can be calculated to be at the 9:00 position, the 5:15 position, the 1:00 position, etc., and the movement of the load can be calculated as, for example, movement clockwise from the 12:00 position to the 1:00 position or counterclockwise from the 6:00 position to the 9:00 position.

In addition, the central electrodes 612 can provide capacitive load sensing for the central area of the substrate 602. For example, the central electrodes 612 can be used to determine a binary value (e.g., whether a touch occurs over the central electrodes 612 or not) or a magnitude-related value (e.g., the strength of the capacitive load over the central electrodes 612) to detect a touch or type of touch applied to the central area of the substrate 602.

In an alternative embodiment, the perimeter electrodes 610 and the central electrodes 612 can used to detect a two-dimensional position of a capacitive load at the capacitive touch input device 600. The position of the capacitive load can be determined based on the combined output signals of electrodes 610, 612 adjacent to the load. In this embodiment, the central portion and outer ring of the circular portion 604 can be positioned in the same plane and on a substrate 602 without overlapping sections. With a lower number of electrodes and with the electrodes being irregularly shaped along paths moving parallel to the x- and y-axes, the touch input device 600 can have less consistent position detection as compared to embodiments of FIGS. 2-5, but, for some applications, lower position resolution and higher position calculation error may be acceptable, such as if the touch input device 600 is in a device where the user is expected to wear gloves, the touch input device 600 diameter is substantially small as compared to a typical finger width (e.g., less than about one inch across), or the user is expected to use a large stylus to provide the capacitive load (and thus, the capacitive load is provided across a relatively large area of the device).

Additionally, a set of switches 614 can be positioned under or attached to the substrate 602 and can be operable by pressing on the substrate 602 to provide switch input in addition to the capacitive touch input detected by the electrodes 610, 612. The switches 614 can be of the type and can have properties corresponding to other switches disclosed elsewhere herein. In an example embodiment, the touch input device 600 can be used with the input pad 116 of controller device 102 of FIG. 1B.

Figure 7:
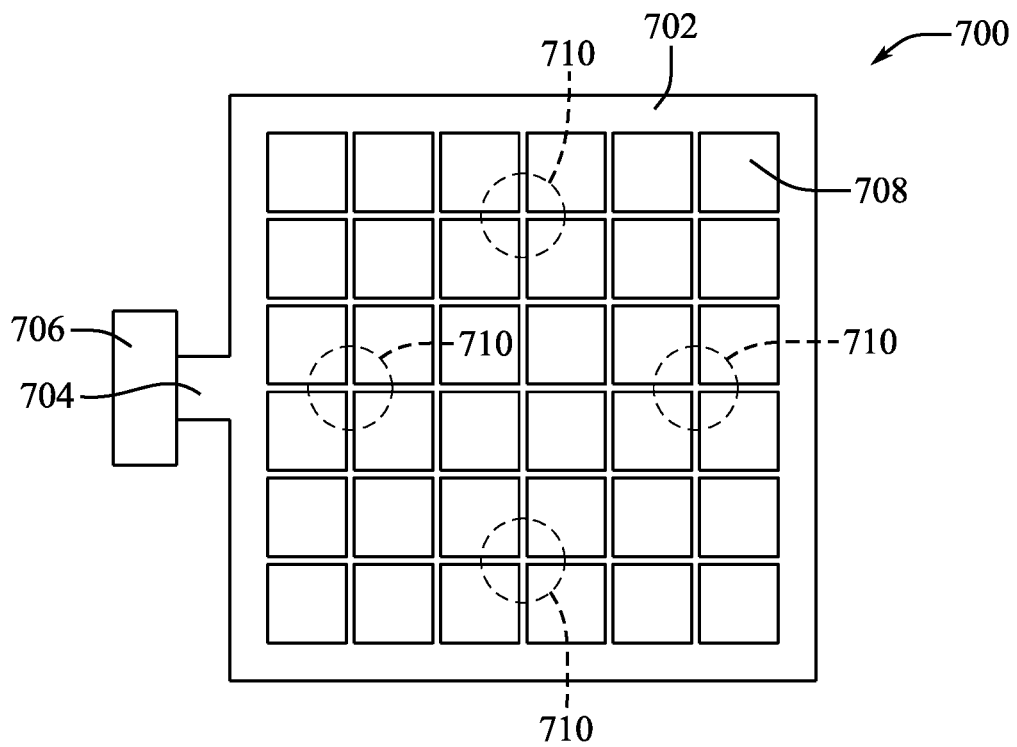
FIG. 7 shows a top view of another capacitive touch input device.

FIG. 7 illustrates a top view of a capacitive touch input device 700 illustrating additional features and principles that can be applied to or combined with other embodiments disclosed herein. The capacitive touch input device 700 includes a substrate 702 having a generally square or rectangular shape connected to a tail 704 and connector 706 configured to function as other tails and connectors described herein. In this embodiment, the electrodes 708 of the substrate 702 can all be square and arranged in a two-dimensional array. The electrodes 708 can each be electrically linked to the connector 706 via conductors extending through the substrate 702. Using principles described in connection with the other embodiments herein, the array of electrodes 708 can be used to sense a position and movement of a capacitive load in two dimensions and, due to the continuous nature of the substrate 702 (i.e., it is a single sheet of material defining the generally square shape), the signals of the electrodes 708 may need only minor correction factors based on properties of button structures, adhesives, etc. overlaying the electrodes 708 rather than also needing to be corrected for the vertical position differences between different parts of the substrate and different shapes and sizes of the electrodes 708.

Capacitive touch input device 700 can also be used with a set of switches at positions 710, wherein pressure on or movement of the substrate 702 can actuate the switches to provide an switch-based input using the device 700 in addition to capacitance-based input. For example, the capacitive touch input device 700 can beneficially be implemented with the input pad 114 of the controller device 100 of FIG. 1A or with the input pad 118 of FIG. 1C.

Figure 8:
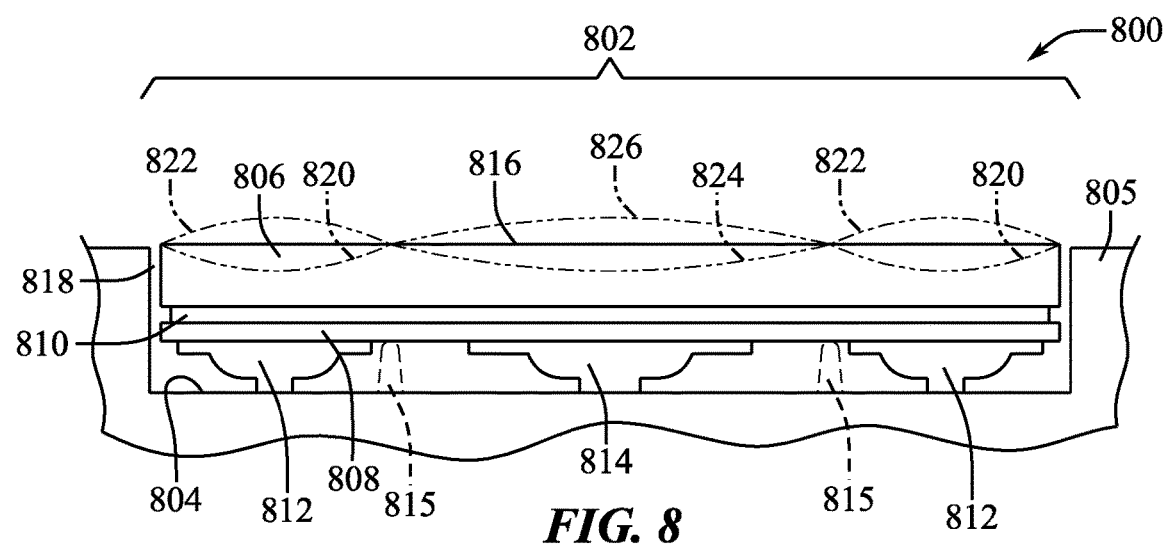
FIG. 8 shows a side section view of an input area of another controller device.

FIG. 8 illustrates a side section view of a controller device 800 illustrating additional features and principles that can be applied to or combined with other embodiments disclosed herein. In this embodiment, the touch input assembly 802 is positioned in a cavity 804 of a housing 805, wherein the assembly 802 includes an input pad 806 attached to a capacitive touch input device 808 using an adhesive layer 810. A set of switches 812, 814 are positioned below the touch input device 808. This touch input assembly 802 can be used when a single-piece input pad is used in a controller device, such as in controller device 100 or in embodiments of controller devices 102 or 104 wherein the central surfaces 126, 130 are not separate parts relative to the perimeter/outer surfaces 124, 128.

Thus, as shown in FIG. 8, the input pad 806 can comprise a single substantially rigid piece (e.g., made of glass or rigid plastic) that (at least substantially) extends across the entire opening of the cavity 804 including covering a center of the cavity 804. Thus, the touch input device 808 can sense a two-dimensional position of capacitive load positioned at the outer surface of the input pad 806 across its entire outer area. A downward force can be applied to the input pad 806 to cause at least portions of the pad to deflect or rotate downward where the force is applied. A force applied above a switch 812 on one side (e.g., below outer surface 124/128) can compress and actuate the switch 812 between the touch input device 808 and the housing 805 while other switches 812, 814 (e.g., on an opposite side of the input pad 806) are not sufficiently compressed to be actuated. The other switches 812, 814 can provide an upward biasing force to the bottom of the touch input device 808 that is not sufficiently overcome by the downward force applied to a different part of the input pad 806. Downward force applied to the center of the input pad 806 can cause deflection and actuation of the center switch 814. This can be caused by bending of the input pad 806 at the center relative to its edges or due to the center switch 814 requiring less force to deform and actuate. In some embodiments, multiple switches, including the center switch 814 (e.g., 814 plus a combination of other switches 812) can actuate simultaneously, and the control system for the controller device 800 can interpret those simultaneous signals as a new input type as compared to those switches being actuated individually. For instance, if deflection of the input pad 806 causes actuation of the center switch 814 in addition to other switches 812, the control system can determine that the force was applied substantially at the center of the input pad 806 and that the function of the center switch 814 should be the output from the device since the center switch 814 would not actuate if the user depressed a side portion of the input pad 806.

In some configurations, the input pad 806 can comprise a compressible or bendable material such as rubber or flexible polymer. Therefore, application of a downward force on the input pad 806 can deform the input pad 806 locally over the switch 812, 814 being actuated so that other switches are unaffected by the downward force. In some cases, a set of supports 815 (i.e., ridges, walls, or bending prevention protrusions) can be positioned between the touch input device 808 and the housing 805 that can help prevent the touch input device 808 from flexing or bending in a manner that causes neighboring switches (e.g., 812) to be actuated when one switch (e.g., 814) is being actuated. The supports 815 can do so by providing support to the bottom surface of the touch input device 808 between the switches and by being rigid enough to resist downward movement of the touch input device 808 where they are located. Thus, the supports 815 can help isolate bending or deflection of the touch input device 808 to localized areas above switches and thereby prevent unwanted actuations of switches that are not under where the user presses down on the input pad 806.

As shown in FIG. 8, the touch input surface 816 of the input pad 806 can be substantially flat across its entire width. A flat touch input surface 816 can simplify capacitive load detection using the principles described above, can provide clean, easy to read aesthetics, can be smoother to provide input using a finger or stylus, and can be easier and less expensive to manufacture. In some embodiments, the touch input surface 816 can be modified to include other surface shapes and features such as, for example, different curvatures for the center areas and outer areas of the touch input surface 816. Outer surface areas can have a concave touch input surface 820 or a convex touch input surface 822, and the center surface area can have a concave or convex touch input surface 824, 826. Various combinations of these surface curvatures 820, 822, 824, 826 can be used, such as a concave outer surface and convex center surface, a convex outer surface and concave center surface, concave outer and center surfaces, convex outer and center surfaces, flat outer surfaces and concave or convex center surface, or concave or convex outer surfaces and a flat center surface. In any case, the curvatures (or lack thereof) can provide tactile information to the user to allow the user to determine, by feel, the location of the capacitive load (i.e., their finger) relative to the width and length of the input pad 806. Without looking, a user can therefore more easily determine whether they are above a particular switch 812, 814 or whether they are near the center or edge of the input pad 806.

A small gap 818 can be positioned between the side of the input pad 806 and the housing 805. The gap 818 can permit the touch input assembly 802 to translate or pivot slightly relative to the housing 805 without binding or scraping side surfaces together, thereby providing more consistency and more durability.

Figure 9:
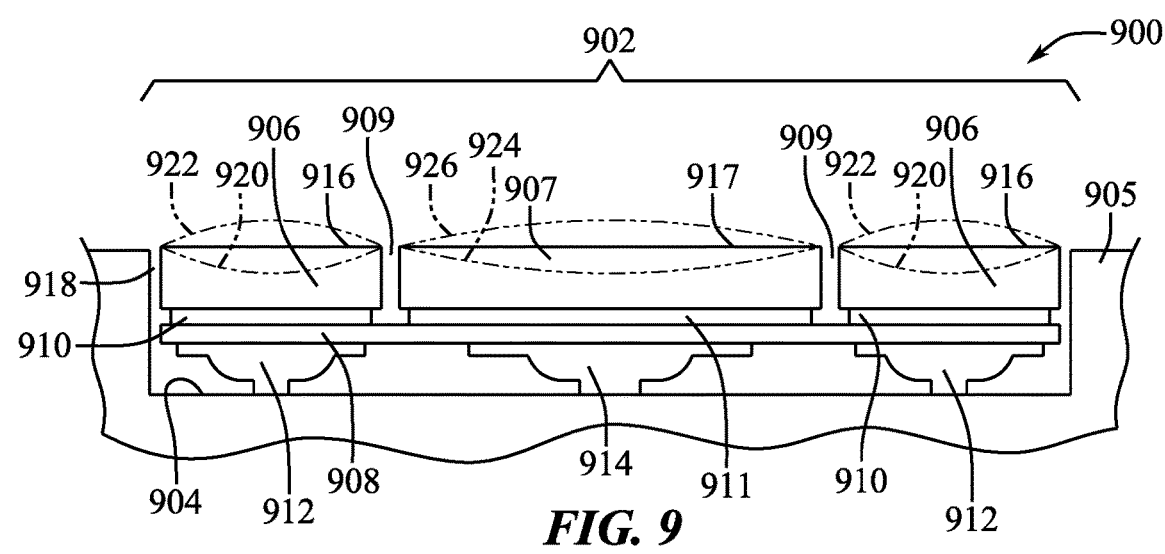
FIG. 9 shows a side section view of an input area of another controller device.

FIG. 9 illustrates a side section view of a controller device 900 illustrating additional features and principles that can be applied to or combined with other embodiments disclosed herein. In this embodiment, similar indicator numerals are used for parts having similar functions to those shown in FIG. 8. The controller device 900 can have an input pad that is divided into at least two parts such as, for example, an outer part 906 and a center part 907. With this configuration, the different parts 906, 907 of the input pad can move more independently when pressed, thereby reducing unwanted actuations of switches 912, 914. Gaps 909 can permit a small amount of lateral or rotational movement of one part (e.g., 906) relative to another (e.g., 907). The touch input device 908 can remain a single piece and can extend underneath all of the parts of the input pad and may include electrodes configured to sense capacitive loads or touches applied across the entire top surfaces 916, 917 of the parts 906, 907. Separate adhesives 910, 911 can be used for each respective part 906, 907. The top surfaces can also include different curvatures, including flat designs, as described above in connection with FIG. 8 (i.e., as indicated by 916, 917, 920, 922, 924, and 926). Additionally, the gaps 909 can help define boundaries between the parts 906, 907 to give further tactile definition to the input pad.

Figure 10:
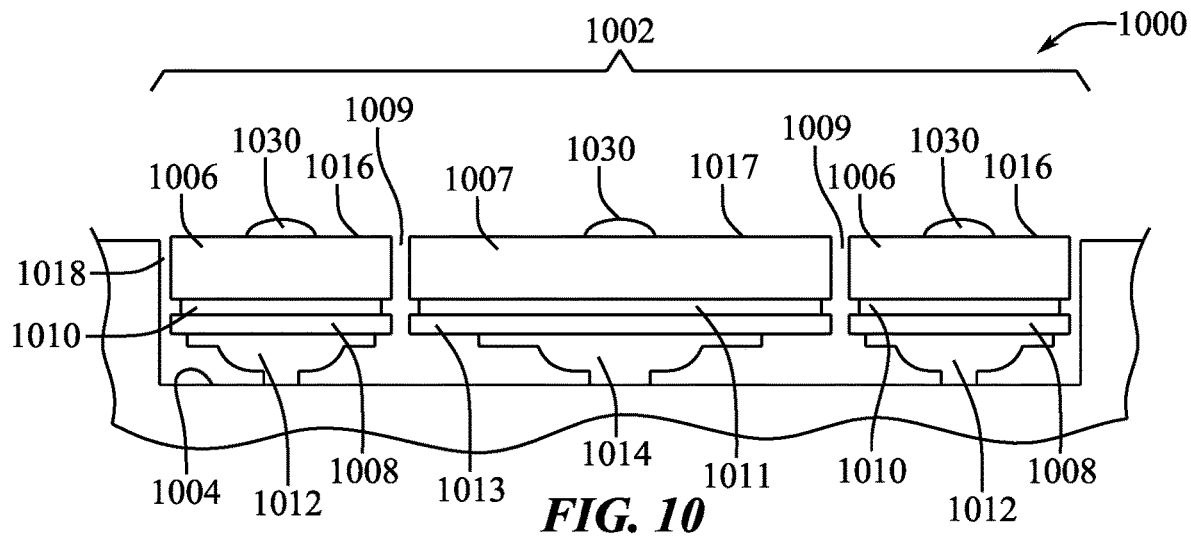
FIG. 10 shows a side section view of an input area of another controller device.

FIG. 10 illustrates a side section view of another controller device 1000 illustrating additional features and principles that can be applied to or combined with other embodiments disclosed herein. In this embodiment, similar indicator numerals are used for parts having similar functions to those shown in FIGS. 8 and 9. Here, the input pad is divided into multiple parts 1006, 1007 that are each adhered (via 1010, 1011) to separate touch input devices 1008, 1013 (or to different relatively movable parts of a single touch input device like the one shown in FIGS. 3-4). Thus, movement of one part 1006 is substantially isolated from movement of a separate part 1007, and switches 1012, 1014 can be actuated individually. In this embodiment, the gaps 1009 include gaps between portions of the touch input devices 1008, 1013 that can potentially cause errors in the detection of position or movement of a capacitive load across the top surfaces 1016, 1017.

This device 1000 also comprises tactile surface features 1030. The surface features 1030 can each be positioned over the top of a respective switch 1012, 1014 so that a user instrument can detect the position of a switch 1012, 1014 by feeling a protrusion. In some embodiments, the surface features 1030 comprise a set of protrusions, one or more recesses, ridges, areas with different surface friction when contacted by a user instrument, similar features, or combinations thereof. Example recess surface features 1032 are shown in FIG. 2.

Figure 11:
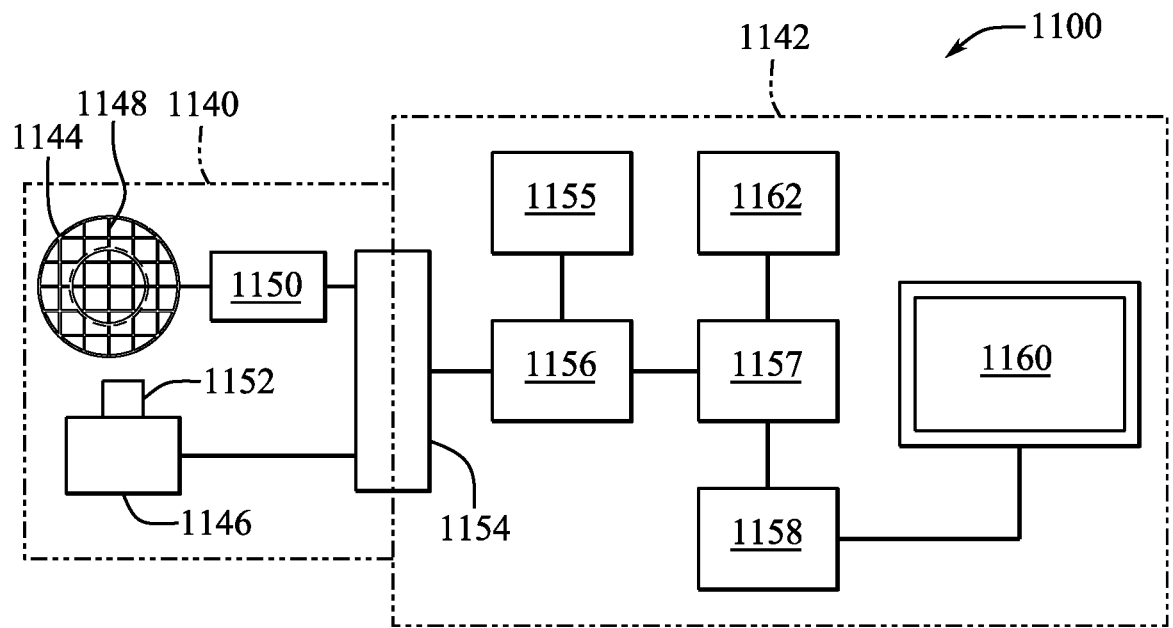
FIG. 11 shows a schematic diagram of an input device connected to a computing device.

FIG. 11 illustrates an example of a simplified block diagram of a computing system 1100 that can be used to implement various embodiments disclosed herein. The computing system 1100 may generally include an input device 1140 operatively connected to computing device 1142. By way of example, input device 1140 can generally correspond to capacitive touch input devices of FIGS. 1A-10, and the computing device 1142 can correspond to a computer, smartphone, tablet computer, media player, or the like that is connected to the input device 1140. Accordingly, in some embodiments, the input pads and touch input assemblies of the present disclosure can be used in input devices (e.g., peripheral desktop input devices, keyboards, trackballs, trackpads, etc.) configured to connect to a computing device 1142 via a communication interface 1154.

As shown, input device 1140 may include depressible touch pad 1144 (e.g., a capacitive touch input device) and one or more movement detectors 1146 (e.g., switches). Touch pad 1144 can be configured to generate tracking signals, and movement detector 1146 can be configured to generate a movement signal when the touch pad is depressed. Although touch pad 1144 may be widely varied, in this embodiment, touch pad 1144 can include capacitance sensors 1148 (e.g., electrodes described above) and a control system 1150 for acquiring position signals from sensors 1148 and supplying the signals to computing device 1142. Control system 1150 can include an application specific integrated circuit (ASIC) that can be configured to monitor the signals from sensors 1148, to compute the absolute location, angular location, direction, speed and/or acceleration of the monitored signals and to report this information to a processor of computing device 1142. In some embodiments, the control system 1150 can implement the correction factors to signals output by the capacitance sensors 1148, as discussed above.

Movement detector 1146 may also be widely varied. In this embodiment, however, movement detector 1146 can take the form of a switch that generates a movement signal when touch pad 1144 is depressed. Movement detector 1146 can correspond to a mechanical, electrical or optical style switch. In one particular implementation, movement detector 1146 can be a mechanical style switch that includes protruding actuator 1152 that may be pushed by touch pad 1144 to generate the movement signal. By way of example, the switch may be a tactile dome switch. The movement detector 1146 can also comprise the switches described in connection with other figures.

Both touch pad 1144 and movement detector 1146 can be operatively coupled to computing device 1142 through communication interface 1154. The communication interface provides a connection point for direct or indirect connection between the input device and the electronic device. Communication interface 1154 may be wired (wires, cables, connectors) or wireless (e.g., transmitter/receiver).

Computing device 1142 may include processor 1157 (e.g., CPU or microprocessor) configured to execute instructions and to carry out operations associated with computing device 1142. For example, using instructions retrieved from memory, the processor can control the reception and manipulation of input and output data between components of computing device 1142. Processor 1157 can be configured to receive input from both movement detector 1146 and touch pad 1144 and can form a signal/command that may be dependent upon both of these inputs. In most cases, processor 1157 can execute instruction under the control of an operating system or other software. Processor 1157 may be a single-chip processor or may be implemented with multiple components.

Computing device 1142 may also include an input/output (I/O) controller 1156 that can be operatively coupled to processor 1157. I/O controller 1156 can be integrated with processor 1157 or it may be a separate component as shown. I/O controller 1156 can generally be configured to control interactions with one or more I/O devices that may be coupled to the computing device 1142, as for example input device 1140 and optional orientation detector 1155, such as an accelerometer. I/O controller 1156 can generally operate by exchanging data between computing device 1142 and I/O devices that desire to communicate with computing device 1142.

Computing device 1142 may also include display controller 1158 that can be operatively coupled to processor 1157. Display controller 1158 can be integrated with processor 1157 or it may be a separate component as shown. Display controller 1158 can be configured to process display commands to produce text and graphics on display screen 1160. By way of example, display screen 1160 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays, and the like. In the embodiment illustrated in FIG. 11, the display device corresponds to a liquid crystal display (LCD).

In some cases, processor 1157, together with an operating system, operates to execute computer code and produce and use data. The computer code and data can reside within program storage area 1162 (e.g., a memory device) that may be operatively coupled to processor 1157. Program storage area 1162 can generally provide a place to hold data that may be used by computing device 1142. By way of example, the program storage area may include Read-Only Memory (ROM), Random-Access Memory (RAM), hard disk drive and/or the like. The computer code and data could also reside on a removable program medium and loaded or installed onto the computing device when needed. In one embodiment, program storage area 1162 can be configured to store information for controlling how the tracking and movement signals generated by the input device may be used, either alone or in combination for example, by computing device 1142 to generate an input event command, such as a single button press.

Figure 12:
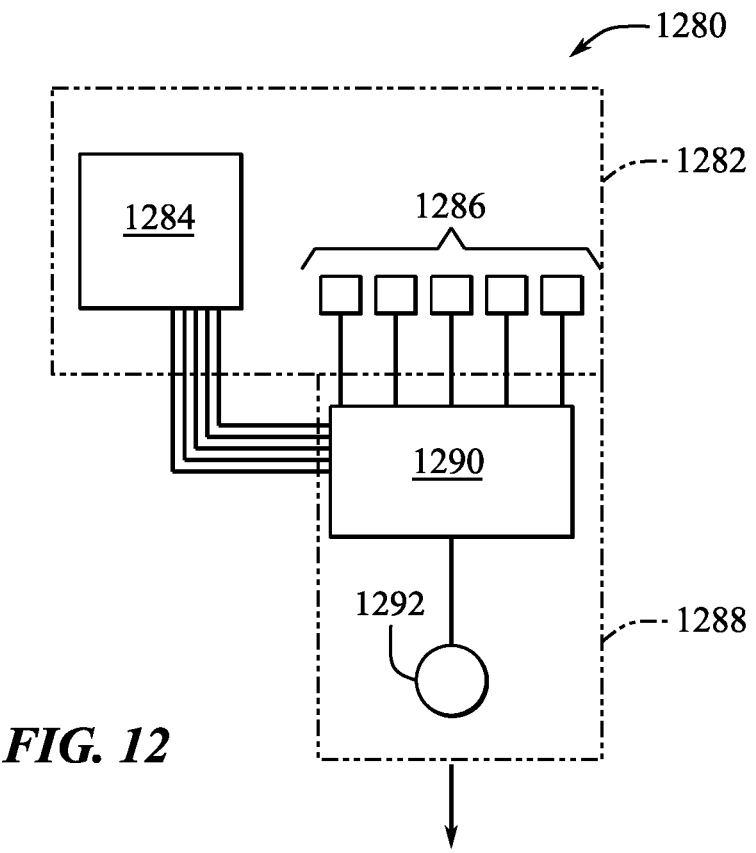
FIG. 12 shows a schematic diagram of an input device that is part of a remote controller device.

FIG. 12 illustrates a simplified block diagram of a remote control 1280 incorporating an input device 1282 according to some embodiments of the present disclosure. By way of example, input device 1282 may generally correspond to any of the previously described input devices. In this particular embodiment, input device 1282 may correspond to the capacitive touch input devices and switches shown in connection with other embodiments herein. Thus, the input device 1282 may include a touch pad 1284 and plurality of switches 1286. Touch pad 1284 and switches 1286 can be operatively coupled to wireless transmitter 1288. One or more connections can be made between the touch pad 1284 and the wireless transmitter 1288. For example, in some embodiments, a separate connection can be used for each electrode of the touch pad 1284. In some embodiments, the touch pad 1284 can include a control system (e.g., 1150) configured to receive and convert signals from the capacitive sensors (e.g., 1148) before sending them to the wireless transmitter 1288.

Wireless transmitter 1288 can be configured to transmit information over a wireless communication link so that an electronic device that has receiving capabilities can receive the information over the wireless communication link. Wireless transmitter 1288 may be widely varied. For example, it can be based on wireless technologies such as FM, radio frequency (RF), BLUETOOTH®, 802.11 UWB (ultra wide band), infrared (IR), magnetic link (induction), similar technologies, and combinations thereof. In the embodiment illustrated in FIG. 12, wireless transmitter 1288 can be based on IR. IR generally refers to wireless technologies that convey data through infrared radiation. As such, wireless transmitter 1288 may generally include IR controller 1290. IR controller 1290 can take the information reported from touch pad 1284 and switches 1286 and convert this information into infrared radiation, as for example using light emitting diode 1292 which emits the radiation in a manner detectable by an IR receiving device.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic controller, comprising:
a housing defining an internal cavity; and
a capacitive touch input assembly disposed within the internal cavity, the capacitive touch input assembly comprising:
an input pad;
a single-piece substrate positioned beneath the input pad and configured to sense touch inputs at the input pad;
a first switch positioned beneath a central portion of the single-piece substrate; and
a second switch positioned beneath an outer portion of the single-piece substrate, the second switch being independently actuatable relative to the first switch in response to a touch input positioned over the second switch at the input pad.

2. The electronic controller of claim 1, wherein the input pad comprises a central input pad spaced apart from an outer input pad.

3. The electronic controller of claim 2, further comprising:
a first adhesive layer adhering the central input pad to the central portion of the single-piece substrate; and
a second adhesive layer adhering the outer input pad to the outer portion of the single-piece substrate, the second adhesive layer being separate from the first adhesive layer.

4. The electronic controller of claim 3, wherein the central input pad and the first adhesive layer define a gap relative to the outer input pad and the second adhesive layer.

5. The electronic controller of claim 1, further comprising a single-piece adhesive layer adhering the input pad to the single-piece substrate.

6. The electronic controller of claim 1, further comprising a set of supports positioned between the single-piece substrate and the housing.

7. The electronic controller of claim 6, wherein the set of supports is configured to isolate bending or deflection of the input pad to locations correlating to the touch inputs.

8. The electronic controller of claim 6, wherein at least one support of the set of supports is positioned laterally between the first switch and the second switch.

9. The electronic controller of claim 1, wherein the input pad comprises a touch input surface having at least one of a convex portion or concave portion.

10. The electronic controller of claim 1, wherein the input pad is entirely flat.

11. A touch input device, comprising:
a housing with an internal cavity; and
a capacitive touch input device disposed in the internal cavity, the capacitive touch input device including:
a central platform;
an outer platform disposed around the central platform;
a central substrate positioned beneath the central platform, the central substrate being configured to sense touches at the central platform;
an outer substrate positioned beneath the outer platform, the outer substrate being configured to sense touches at the outer platform;
a central adhesive layer positioned between the central platform and the central substrate;
an outer adhesive layer positioned between the outer platform and the outer substrate,
a first switch positioned beneath the central substrate, the first switch being actuatable in response to movement of the central platform relative to the outer platform; and
a second switch positioned beneath the outer substrate, the second switch being actuatable in response to movement of the outer platform relative to the central platform.

12. The touch input device of claim 11, further comprising a tactile surface feature disposed on at least one of the central platform or the outer platform.

13. The touch input device of claim 12, wherein the tactile surface feature comprises multiple tactile surface features disposed on the outer platform and the central platform.

14. The touch input device of claim 12, wherein the tactile surface feature is aligned with the first switch on the central platform.

15. The touch input device of claim 11, wherein the central substrate and the outer substrate are separated from each other by a gap.

16. The touch input device of claim 11, wherein the central adhesive layer and the outer adhesive layer are separated from each other by a gap.

17. The touch input device of claim 11, wherein the movement of the outer platform is configured to be substantially isolated from the central platform.

18. A touch sensitive control assembly, comprising:
a housing having an internal cavity; and
a touch input assembly disposed within the internal cavity, the touch input assembly including:
an input surface movably disposed within the internal cavity;
a single-piece substrate positioned below the input surface and comprising a non-rectangular region including a central set of touch-sensitive electrodes and a perimeter set of touch-sensitive electrodes positioned around the central set of touch-sensitive electrodes; and
a central switch positioned beneath the single-piece substrate, the central switch being operable via a touch input applied to the input surface above the central set of touch-sensitive electrodes,
wherein each touch-sensitive electrode of the central set of touch-sensitive electrodes and the perimeter set of touch-sensitive electrodes is spaced apart relative to an adjacent touch-sensitive electrode by non-conductive material.

19. The touch sensitive control assembly of claim 18, further comprising at least one perimeter switch disposed beneath the single-piece substrate and actuatable in response to a force applied to the input surface above at least one touch-sensitive electrode of the perimeter set of touch-sensitive electrodes.

20. The touch sensitive control assembly of claim 18, wherein each touch-sensitive electrode of the central set of touch-sensitive electrodes and the perimeter set of touch-sensitive electrodes includes at least one curved edge.

* * * * *